US012324068B2

(12) United States Patent
Bradford

(10) Patent No.: US 12,324,068 B2
(45) Date of Patent: Jun. 3, 2025

(54) LIGHT-EMITTING DIODES AS SHUNT REGULATOR TO POWER LOW-VOLTAGE CIRCUITS

(71) Applicant: CreeLED, Inc., Durham, NC (US)

(72) Inventor: Everett Bradford, Apex, NC (US)

(73) Assignee: CreeLED, Inc., Durham, NC (US)

( * ) Notice: Subject to any disclaimer, the term of this patent is extended or adjusted under 35 U.S.C. 154(b) by 139 days.

(21) Appl. No.: 18/182,458

(22) Filed: Mar. 13, 2023

(65) Prior Publication Data

US 2024/0314908 A1 Sep. 19, 2024

(51) Int. Cl.
*H05B 45/30* (2020.01)
*G09G 3/32* (2016.01)
*H05B 45/44* (2020.01)

(52) U.S. Cl.
CPC ............... *H05B 45/44* (2020.01); *G09G 3/32* (2013.01)

(58) Field of Classification Search
CPC ........ H05B 45/00; H05B 45/20; H05B 45/30; H05B 45/395; H05B 45/40; H05B 45/44; H05B 45/46; H05B 45/48; G09G 3/30; G09G 3/32
See application file for complete search history.

(56) References Cited

U.S. PATENT DOCUMENTS

2012/0104952 A1* 5/2012 Chen ..................... H05B 45/48 315/122
2015/0201471 A1* 7/2015 Hsu ....................... H05B 45/48 315/200 R

* cited by examiner

*Primary Examiner* — Long Nguyen
(74) *Attorney, Agent, or Firm* — Withrow & Terranova, P.L.L.C.

(57) ABSTRACT

Light-emitting diode (LED) fixture circuits and devices with LEDs as shunt voltage regulators to power low-voltage circuits are disclosed. LED fixture circuits and devices are disclosed where a direct current (DC) input voltage supplied to an LED array of a plurality of LEDs is regulated using a shunt LED comprising one or more LEDs. The shunt LED is configured to provide a regulated voltage lower than the DC input voltage while generating a light that contributes to the overall luminescence of a given circuit or device.

19 Claims, 5 Drawing Sheets

LIGHT-EMITTING DIODES AS SHUNT REGULATOR TO POWER LOW-VOLTAGE CIRCUITS

FIELD OF THE DISCLOSURE

The present disclosure relates to light-emitting diode (LED) fixture circuits and devices. In particular, the present disclosure relates to using LEDs as shunt voltage regulators to power low-voltage circuits.

BACKGROUND

Advancements in solid-state lighting technologies and specifically light-emitting diodes (LEDs) continue to result in remarkable performance improvements of LED lighting devices. Generally, LED lighting devices include lighting panels having a plurality of LED light sources capable of generating light. To keep up with the consumer demands for more features, enhanced efficiency, and increased reliability, newer technologies include one or more low-power electronic devices as part of an LED fixture circuits and devices to perform various functions such as monitoring the temperature, color tuning or adjustment, color calibration, active color controlling, providing overload safety, or otherwise controlling the LEDs. However, the lower operating voltage of low-power electronic devices is often incompatible with the existing output voltage of the power supply unit.

To solve this lower voltage incompatibility issue, the industry has turned to voltage regulators that are typically available as integrated circuits. Nonetheless, power consumption is a trade-off associated with voltage regulators. Therefore, the conventional technique of using a low-efficiency voltage regulator circuit to provide an operational voltage supply to low-voltage electronic devices remains a common challenge. In this regard, there is a need for improved LED fixture circuits and devices.

SUMMARY

The present disclosure relates to light-emitting diode (LED) fixture circuits and devices. In particular, the present disclosure relates to using LEDs as shunt voltage regulators to power low-voltage circuits. LED fixture circuits and devices are disclosed wherein a direct current (DC) input voltage supplied to an LED array of a plurality of LEDs is regulated using a shunt LED comprising one or more LEDs. The shunt LED is configured to provide a regulated voltage lower than the DC input voltage while generating a light that contributes to the overall luminescence of a given circuit or device.

In one aspect, an LED fixture circuit is disclosed. The LED fixture circuit comprises a first LED array comprising a plurality of LEDs connected in series, parallel, or a combination thereof between a first input node and a first output node. The first LED array is configured to generate a light or a light mixture. The LED fixture circuit further comprises a first shunt LED comprising one or more LEDs connected in series, parallel, or a combination thereof between a second input node and a second output node. The first shunt LED is also configured to generate a light or a light mixture. In addition, the LED fixture circuit comprises a first shunt terminal that outputs a first regulated voltage generated at the second input node. In this manner, the first input node and the second output node are configured to have a potential difference equal to a direct current (DC) input voltage, the first output node couples to the second input node, and the first DC regulated voltage equals a forward voltage drop across the first shunt LED and is lower than a first DC input voltage drop.

In an embodiment, a first input terminal of the LED fixture circuit is supplied with a constant DC input current in the range of 0 mA to 2000 mA.

In an embodiment, the DC input voltage of the LED fixture circuit is in the range of 12V to 200V.

In another embodiment, the first shunt LED of the LED fixture circuit comprises one or more series-connected LEDs between the second input node and the second output node with the forward voltage drop in the range of 2V to 12V.

In yet another embodiment, the first shunt LED of the LED fixture circuit further comprises two or more substantially similar LEDs connected in parallel between the second input node and the second output node with the forward voltage drop in the range of 2V to 12V.

According to an embodiment, each LED forming part of the first LED array and the first shunt LED of the LED fixture circuit is configured to generate a white, a red, a green, a blue, a yellow, or an amber light, or a light that is a mixture thereof.

In an embodiment, the LED fixture circuit further comprises a second shunt LED comprising one or more LEDs connected in series, parallel, or a combination thereof between a third input node and a third output node, and a second shunt terminal that outputs a second regulated voltage generated at the third input node. In this manner, the first output node couples to the second input node via the second shunt LED such that the third input node connects to the first output node and the third output node connects to the second input node, and a second DC regulated voltage equals a forward voltage drop across the second shunt LED and the first shunt LED and is higher than the first regulated voltage and lower than the first DC input voltage drop.

In another embodiment, the LED fixture circuit further comprises a second LED array comprising a plurality of LEDs connected in series, parallel, or a combination thereof between a fourth input node and a fourth output node and configured to generate a light or a light mixture, a third shunt LED comprising one or more LEDs connected in series, parallel, or a combination thereof between a fifth input node and a fifth output node and configured to generate a light or a light mixture, and a third shunt terminal that outputs a third regulated voltage generated at the fifth input node. In this manner, the fourth input node connects to the first input node and the fifth output node connects to the second output node and are configured to have a potential difference equal to the direct current (DC) input voltage, and the fourth output node couples to the fifth input node, and the third DC regulated voltage equals a forward voltage drop across the third shunt LED and is lower than the first DC input voltage drop.

In an embodiment, the third regulated voltage is in the range of 2V to 12V.

According to an embodiment, each LED forming part of the first LED array, the second LED array, the first shunt LED, the second shunt LED, and the third shunt LED is configured to generate a white, a red, a green, a blue, a yellow, or an amber light, or a light that is a mixture thereof.

In another aspect, an LED fixture device is disclosed. The LED fixture device comprises a positive supply terminal and a negative supply terminal configured to have a potential difference equal to a direct current (DC) input voltage, a first low-voltage electronic device having a first positive supply pin and a first negative supply pin, a first LED array comprising a plurality of LEDs connected in series, parallel, or a combination thereof between a first input node and a first output node and configured to generate a light or a light mixture, a first shunt LED comprising one or more LEDs connected in series, parallel, or a combination thereof between a second input node and a second output node and configured to generate a light or a light mixture, and a first shunt terminal that supplies a first regulated voltage generated at the second input node and is coupled to the positive supply pin to operate the first low-voltage electronic device. In this manner, the first input node connects to the positive supply terminal, the second output node and the output supply node connect to the negative supply terminal, the first output node couples to the second input node; and wherein a first DC regulated voltage equals a forward voltage drop across the first shunt LED and is lower than the first DC input voltage.

In an embodiment, the first low-voltage electronic device of the LED fixture device requires a voltage in the range of 2V to 12V for operation.

In another embodiment, the first low-voltage electronic device of the LED fixture device requires a nominal voltage equal to one or more of 2.0V, 3.0V, 3.3V, 5.0V, 9.0V, or 12.0V for operation.

According to yet another embodiment, the LED fixture device further comprises a low-voltage regulator having an input pin and an output pin, wherein the first shunt terminal and the first positive supply pin couple via the low-voltage regulator such that a first shunt node having a first regulated voltage is connected to the input pin of the low-voltage regulator and the first positive supply pin of the low-voltage electronic device connects to the output pin of the voltage regulator configured to further regulate the first regulated voltage.

In an embodiment, a power supply terminal connects to an external LED driver configured to receive an alternating current (AC) input voltage from a power supply source and supply a constant DC input current in the range of 0 mA to 2000 mA through the positive supply terminal.

In an embodiment, the first DC input voltage of the LED fixture device is in the range of 12V to 200V.

In another embodiment, the first low-voltage electronic device of the LED fixture device is one of a processing unit, a control unit, a sensor, a data storage unit, a wireless transmitter/receiver, or any other low-voltage integrated circuit, device, or component.

According to yet another embodiment, each LED forming part of the first LED array and the first shunt LED of the LED fixture device is configured to generate a white, a red, a green, a blue, a yellow, or an amber light, or a light that is a mixture thereof.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

DETAILED DESCRIPTION

Figure 1:
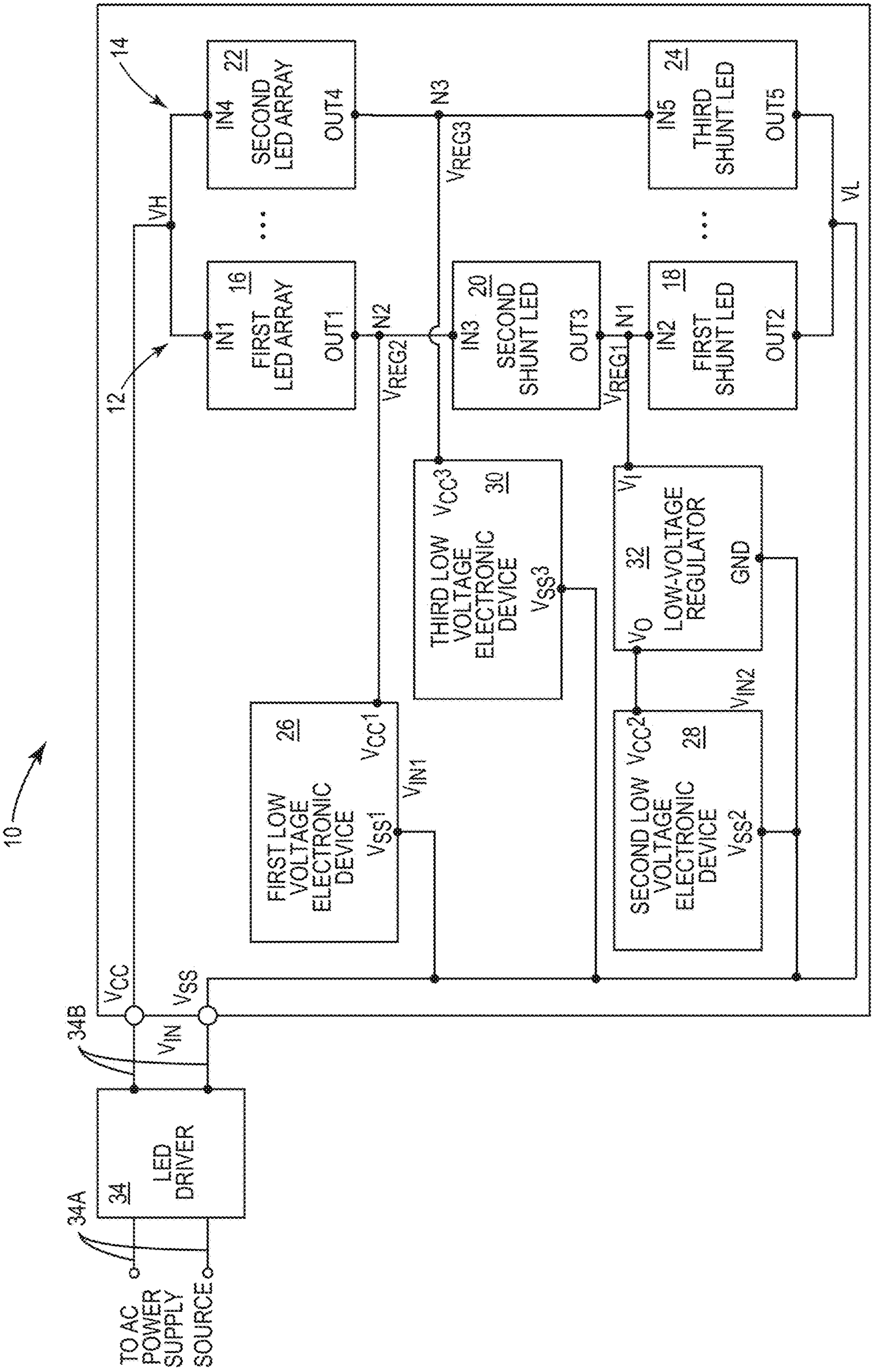
FIG. 1 shows an exemplary block diagram of a light-emitting diode (LED) fixture device powered by an external LED driver.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

The present disclosure relates to light-emitting diode (LED) fixture circuits and devices. In particular, the present disclosure relates to using LEDs as shunt voltage regulators to power low-voltage circuits. LED fixture circuits and devices are disclosed wherein a direct current (DC) input voltage supplied to an LED array of a plurality of LEDs is regulated using a shunt LED comprising one or more LEDs. The shunt LED is configured to provide a regulated voltage lower than the DC input voltage while generating a light that contributes to the overall luminescence of a given circuit or device.

FIG. 1 shows an exemplary block diagram of an LED fixture device 10 powered by an external LED driver 34. The LED fixture device 10 comprises a positive supply terminal $V_{CC}$ and a negative supply terminal $V_{SS}$ and includes a first LED branch 12 having a first LED array 16, a first shunt LED 18 and a second shunt LED 20, and a second LED branch 14 having a second LED array 22 and a third shunt LED 24. In this manner, the first LED array 16 couples to the first shunt LED 18 via the second shunt LED 20 to form a first shunt node N1 configured to provide a first regulated voltage $V_{REG}$1 and a second shunt node N2 configured to generate a second regulated voltage $V_{REG}$2. In a similar manner, the second LED array 22 connects to the third shunt LED 24 to form a third shunt node N3 configured to generate a third regulated voltage $V_{REG}$3.

The LED fixture device 10 further comprises a first low-voltage electronic device 26, a second low-voltage electronic device 28, and a third low-voltage electronic device 30 that each may be one of a processing unit, a control unit, a sensor, a data storage unit, a wireless transmitter/receiver, or any other low-voltage integrated circuit, device, or component. In application, the first low-voltage electronic device 26, the second low-voltage electronic device 28, and the third low-voltage electronic device 30 may be utilized in or in connection with the LED fixture device 10 to perform functions such as monitoring the temperature, color tuning or adjustment, color calibration, active color controlling, providing overload safety, or otherwise controlling the LEDs within the LED fixture device 10.

During operation, each of the first low-voltage electronic device 26, the second low-voltage electronic device 28, and the third low-voltage electronic device 30 may have a voltage requirement in the range of 2.0V to 12.0V for a safe and reliable operation. Alternatively or in addition, each of the first low-voltage electronic device 26, the second low-voltage electronic device 28, and the third low-voltage electronic device 30 may have a nominal voltage requirement that may be one or more of 2.0V, 3.0V, 3.3V, 5.0V, 9.0V, or 12.0V for a safe and reliable operation.

The LED fixture device 10 also comprises a low-voltage regulator 32. As is described in more detail elsewhere herein, a low-voltage regulator may be used to further regulate a regulated voltage generated by a shunt LED. In this manner, the low-voltage regulator 32 is used to further regulate the second regulated voltage $V_{REG}$2 generated at the second shunt node N2 to operate the second low-voltage electronic device 28.

As illustrated, the LED driver 34 may be used to supply the LED fixture device 10 with a desired, constant, and stable input current $I_{IN}$. The LED driver 34 comprises a pair of power input lines 34A and a pair of power output lines 34B. The pair of power input lines 34A electrically connects to a power supply source, for example, an alternating current (AC) power source or a direct current (DC) power supply source. The pair of power output lines 34B electrically connects to the positive supply terminal $V_{CC}$ and the negative supply terminal $V_{SS}$ of the LED fixture device 10. In this manner, the LED driver 34 may generate a DC input voltage $V_{IN}$ between the positive supply terminal $V_{CC}$ and the negative supply terminal $V_{SS}$ of the LED fixture device 10. In some implementations, the LED driver 34 is an external electronic circuit coupled between the power supply source and the LED fixture device 10. However, in certain other embodiments and as described later in conjunction with FIG. 2, an LED driver 34' may form part of an LED fixture device 10'.

The DC input voltage $V_{IN}$ may fluctuate as the impedance of the circuit components of LED fixture device 10 changes over time or as a result of internal or external factors such as changes in temperature. Irrespective of such fluctuations, the input voltage $V_{IN}$ is kept at a substantially constant nominal value equal to or higher than equivalent forward voltage drops of LEDs in the first LED branch 12 and the second LED branch 14. During operation, the input voltage $V_{IN}$ may fall within a minimum of 12V, 36V, 55V, or 150V and a maximum of 15V, 45V, 60V, or 200V. Furthermore, the input current $I_{IN}$ may have a value that falls within a minimum of 100 mA, 300 mA, 700 mA, or 1500 mA and a maximum of 200 mA, 400 mA, 800 mA, or 2000 mA.

According to various embodiments, the input current $I_{IN}$ may equal 150 mA, 350 mA, 700 mA, or 2000 mA, including ±100 mA. In this manner, the LED fixture device 10 may consume an input power $P_{IN}$ in the range of 1 W to 100 W.

The first low-voltage electronic device 26 comprises a first positive supply terminal $V_{CC}$1 and a first negative supply terminal $V_{SS}$1 that are supplied with a first voltage potential difference equal to a first input voltage $V_{IN}$1 required for a safe and reliable operation of the device. The second low-voltage electronic device 28 comprises a second positive supply terminal $V_{CC}$2 and a second negative supply terminal $V_{SS}$2 which are supplied with a second voltage potential difference equal to a second input voltage $V_{IN}$2 required for a safe and reliable operation of the device. As described in further detail herein, the first input voltage $V_{IN}$1 and the second input voltage $V_{IN}$2 have lower voltages compared with the input voltage $V_{IN}$ of the LED fixture device 10. Therefore, as described in further detail herein, the input voltage $V_{IN}$ of the LED fixture device 10 should be regulated to a lower voltage to meet input voltage requirements of the first low-voltage electronic device 26, the second low-voltage electronic device 28, and the third low-voltage electronic device 30.

Conventionally, one or more high-voltage regulators (not shown) are implemented as part of the LED fixture device 10. In this manner, for example, a high-voltage regulator may be used to directly reduce a higher voltage level of the input voltage $V_{IN}$ to a lower voltage level that meets the requirements of low-voltage electronic devices such as, the first low-voltage electronic device 26, the second low-voltage electronic device 28, or the third low-voltage electronic device 30. However, high-voltage regulators consume a significant amount of power though only a small amount of power is needed to operate low-voltage electronic devices. Thereby, during operation, a high-voltage regulator leads to a power loss equal to or greater than 2.5% of the input power $P_{IN}$ of LED fixture device 10.

The above-mentioned power loss may be substantially reduced or eliminated using the first regulated voltage $V_{REG}$1 and the second regulated voltage $V_{REG}$2 to supply power, directly or indirectly, to the first low-voltage electronic device 26, the second low-voltage electronic device 28, and/or the third low-voltage electronic device 30 and in accordance with various embodiments of the present disclosure.

Returning to FIG. 1, the first LED array 16 comprises a plurality of interconnected LEDs between a first input node IN1 and a first output node OUT1. The first shunt LED 18 comprises one or more LEDs connected in forward bias mode between a second input node IN2 and a second output node OUT2. In an embodiment, the first output node OUT1 of the first LED array 16 couples to the second input node IN2 of the first shunt LED 18 to form the first LED branch 12 and the first shunt node N1. In this manner, an input node of the first LED branch 12 is the first input node IN1 of the first LED array 16 and an output node of the first LED branch 12 is the second output node OUT2 of the first shunt LED 18.

In yet another embodiment, the first LED array 16 may further connect to the second shunt LED 20 to form the second shunt node N2 in addition to the first shunt node N1 of the first shunt LED 18. In this manner, the second shunt LED 20 comprising one or more LEDs connected in forward bias mode between a third input node IN3 and a third output node OUT3 is used to couple the first LED array 16 to the first shunt LED 18. In application, the first output node OUT1 of the first LED array 16 connects to the third input node IN3 of the second shunt LED 20 and the third output node OUT3 of the second shunt LED 20 connects to the second input node IN2 of the first shunt LED 18. Therefore, the input node of the first LED branch 12 is the first input node IN1 of the first LED array 16 and the output node of the first LED branch 12 is the second output node OUT2 of the first shunt LED 18.

The second LED array 22 comprises a plurality of interconnected LEDs between a fourth input node IN4 and a fourth output node OUT4. The third shunt LED 24 comprises one or more LEDs connected in forward biased mode between a fifth input node IN5 and a fifth output node OUT5. In application, the fourth output node OUT4 of the second LED array 22 connects to the fifth input node IN5 of the third shunt LED 24 to form the second LED branch 14 and the third shunt node N3. In this manner, an input node of the second LED branch 14 is the fourth input node IN4 of the second LED array 22 and an output node of the second LED branch 14 is the fifth output node OUT5 of the third shunt LED 24.

According to various embodiments of the present disclosure, the plurality of interconnected LEDs of the first LED array 16 and the second LED array 22 may connect in series, parallel, or a combination thereof. Similarly, the one or more LEDs of the first shunt LED 18 and the second shunt LED 20 may connect in a forward biased mode in series, parallel, or a combination thereof.

In application, the input node IN1 of the first LED branch 12 connects to the input node IN4 of the second LED branch 14 to form a high-voltage node VH. The output node OUT2 of the first LED branch 12 connects to the output node OUT4 of the second LED branch 14 to form a low-voltage node VL. In an embodiment, the high-voltage node VH and the low-voltage node VL electrically connect to the positive supply terminal $V_{CC}$ and the negative supply terminal $V_{SS}$, respectively. In this manner, the voltage difference between the high-voltage node VH and the low-voltage node VL equals the DC input voltage $V_{IN}$ of the LED fixture device 10.

During operation, the input current $I_{IN}$ is distributed between the first LED branch 12 and the second LED branch 14. Accordingly, a first portion of the input current $I_{IN}$ is fed to the first LED array 16 to generate a first light of desired color and intensity and is shunted through the second shunt LED 20 and the first shunt LED 18 to the negative supply terminal $V_{SS}$ to produce the first regulated voltage $V_{REG}$1 and the second regulated voltage $V_{REG}$2 and to generate an additional light of desired color and intensity associated with the first shunt LED 18 and the second shunt LED 20. Similarly, a second portion of the input current $I_{IN}$ is fed to the second LED array 22 to generate a light of desired color and intensity and is shunted through the third shunt LED 24 to the negative supply terminal $V_{SS}$ to generate the third regulated voltage $V_{REG}$3 and to produce an additional light of desired color. Accordingly, the first regulated voltage $V_{REG}$1, the second regulated voltage $V_{REG}$2, and the third regulated voltage $V_{REG}$3 are used to, directly or indirectly, power each of the first low-voltage electronic device 26, the second low-voltage electronic device 28, and the third low-voltage electronic device 30.

As will be appreciated by those of skill in the art, the principles of the present disclosure are applicable to various embodiments with a variety of LEDs. In particular, it is to be understood that the scope of the present disclosure is not so limited to LEDs as singular P-N junctions and that each individual LED may be replaced by an LED chip or an LED package. Furthermore, in certain embodiments, each of the first LED array 16 and the second LED array 22 may further include other active or passive components or certain discrete integrated circuits (not shown here).

According to various embodiments of the present disclosure, each of the first LED array 16, the second LED array 22, the first shunt LED 18, the second shunt LED 20, and the third shunt LED 24 may comprise a different number, type, combination, and/or connection topology of LEDs. Alternatively, the first LED array 16 may be substantially similar to the second LED array 22.

It should be further noted that the color of a light emitted from an LED as part of the first LED branch 12 or the second LED branch 14 primarily depends on the composition of the material used to fabricate the LED, whereas the light output of an LED is directly related to the current flowing through the LED. In this manner, an LED generates a light that may be one of a white with a correlated color temperature (CCT) in the range of 2000K to 8000K, a red with a wavelength in the range of 700 nm to 590 nm, a green with a wavelength in the range of 580 nm to 480 nm, a blue with a wavelength in the range of 500 nm to 430 nm, a yellow with a wavelength in the range of 590 nm to 540 nm, or an amber with a wavelength in the range of 590 nm to 610 nm, or one of many other colors that are not disclosed herein for the brevity of description.

In this manner, the voltage drop across an LED as part of each of the first shunt LED 18, the second shunt LED 20, and the third shunt LED 24 depends on the composition of the material used to fabricate the LED and remains constant over a wide range of currents flowing through the LED. In this manner, the forward voltage drop for a current in the range of 0 mA to 2000 mA passing through a white LED is in the range of 2.5V to 3.5V, a red LED is in the range of 1.8V to 2.4V, a green LED is in the range of 2.5V to 3.5V, a blue LED is in the range of 2.5V to 3.5V, a yellow LED is in the range of 1.8V to 3.5V, and an amber LED is in the range of 1.8V to 2.4V. For example, in an embodiment, the forward voltage drop for a current of 350 mA passing through a white LED equals 2.8V, a red LED equals 2.0V, a green LED equals 2.8V, a blue LED equals 2.8V, a yellow LED equals 2.8V, and an amber LED equals 2.0V.

In operation, voltage levels of each of the first regulated voltage $V_{REG}$1 generated at the first shunt node N1, the second regulated voltage $V_{REG}$2 generated at the second shunt node N2, and the third regulated voltage $V_{REG}$3 generated at the second shunt node N3 may be adjusted using numbers, colors, and connection topologies of LEDs forming part of each of the first shunt LED 18, the second shunt LED 20, and the third shunt LED 24. In operation, the first regulated voltage $V_{REG}$1 equals the forward voltage drop across the first shunt LED 18 and the third regulated voltage $V_{REG}$3 equals the forward voltage drop across the third shunt LED 24 whereas the second regulated voltage $V_{REG}$2 equals the forward voltage drop across the second shunt LED 20 and the first shunt LED 18. In this manner, each of the first regulated voltage $V_{REG}$1, the second regulated voltage $V_{REG}$2, and the third regulated voltage $V_{REG}$3 may be in the range of 1.8V, 2.0V, 2.8V, or 3.5V to 4.0V, 4.8V, 8.4V, or 11.2V and falls below the input voltage $V_{IN}$ of the LED fixture device 10. Furthermore, the first regulated voltage $V_{REG}$1 would have a value equal or lower than the second regulated voltage $V_{REG}$2.

In the example of the first low-voltage electronic device 26, the first positive supply terminal $V_{CC}$1 connects to the second shunt node N2 having the first second regulated voltage $V_{REG}$2, and the first negative supply terminal $V_{SS}$1 connects to the negative supply terminal $V_{SS}$. In this manner, the voltage required to operate the first low-voltage electronic device 26 is directly supplied by the second regulated voltage $V_{REG}$2 configured by the first shunt LED 18 and the second shut LED 20. Therefore, the first shunt LED 18 and the second shut LED 20 should be configured such that the second regulated voltage $V_{REG}$2 meets the input voltage requirements of the first low-voltage electronic device 26.

In the example of the second low-voltage electronic device 28, the first shunt node N1 having the first regulated voltage $V_{REG}$1 connects to an input terminal $V_I$ of a low-voltage regulator 32. The low-voltage regulator 32 further includes an output terminal $V_O$ that connects to the second positive supply terminal $V_{CC}$2 of the second low-voltage electronic device 28. The low-voltage regulator 32 further comprises a ground terminal GND that may be connected to the negative supply terminal $V_{SS}$. In this manner, the voltage required to operate the second low-voltage electronic device 28 is supplied by the low-voltage regulator 32. Therefore, the first shunt LED 18 should be configured such that the ratio between the first regulated voltage $V_{REG}$1 and the voltage supplied by the low-voltage regulator 32 to the second low-voltage electronic device 28. approaches unity to further improve the efficiency of the low-voltage regulator 32.

In the example of the third low-voltage electronic device 30, a third positive supply terminal $V_{CC}$3 connects to the third shunt node N3 having the third regulated voltage $V_{REG}$3, and a third negative supply terminal $V_{SS}$3 connects to the negative supply terminal $V_{SS}$. In this manner, the voltage required to operate the third low-voltage electronic device 30 is directly supplied by the third regulated voltage $V_{REG}$3 configured by the third shunt LED 24. Therefore, the third shunt LED 24 should be configured such that the third regulated voltage $V_{REG}$3 meets the input voltage requirements of the third low-voltage electronic device 30.

In an embodiment, the input voltage requirements of the first low-voltage electronic device 26, the second low-voltage electronic device 28, or the third low-voltage electronic device 30 may be one or more nominal voltage levels such as 2.0V, 3.0V, 3.3V, 5.0V, 9.0V, or 12.0V. Alternatively or in addition, the input voltage requirements of the first low-voltage electronic device 26, the second low-voltage electronic device 28, or the third low-voltage electronic device 30 may be a voltage level in the range of 2.0V, 3.0V, 3.3V, or 5.0V to 3.3V, 5.0V, 9.0V, or 12.0V.

It should be appreciated that while FIG. 1 only illustrates two LED branches (i.e., the first LED branch 12 and the second LED branch 14) as part of the LED fixture device 10, same designs and methods of design as disclosed herein apply to any number of a plurality of LED branches. As will be appreciated by one of skill in the art, paralleled LED branches such as the first LED branch 12 and the second LED branch 14 are required to have closely matched equivalent forward voltage drops in order to have similar currents and, therefore, similar intensity in generated light. Nonetheless, fluctuations in currents shunting through LEDs, including the first shunt LED 18, the second shunt LED 20, or the third shunt LED 24 does not affect forward voltage drops across the LEDs. In this manner, the equivalent forward voltage drop across each of the first shunt LED 18, the second shunt LED 20, and the third shunt LED 24, and, therefore, the first regulated voltage $V_{REG}$1, the second regulated voltage $V_{REG}$2, and the third regulated voltage $V_{REG}$3 remains substantially independent of fluctuations in the input current $I_{IN}$.

It should be further appreciated that while FIG. 1 only illustrates two or one shunt LED (i.e., the first shunt LED 18 and the second shunt LED 20, or the third shunt LED 24) as part of each LED branch, i.e., the first LED branch 12 and the second LED branch 14, respectively, the same design and method of design as disclosed herein applies to any number of shunt LEDs may be connected in series between an output node of an LED array, for example, the first output node OUT1 of the first LED array 16 or the fourth output node OUT4 of the second LED array 22, and the low-voltage node VL.

The following examples, to which, however, the present disclosure should not be limited to, are provided in order to help illustrate the design and utility of two exemplary embodiments in conjunction to FIG. 1. It should be noted that examples below are nonlimiting and are solely provided to offer a better understanding of corresponding embodiment in reference to each example.

Example 1

In a nonlimiting embodiment wherein the first shunt LED 18 comprises a single red LED, for a given current 350 mA passing through the first shunt LED 18, the first regulated voltage $V_{REG}$1 generated by the first shunt node N1 equals the equivalent forward voltage drop across the first shunt LED 18 (i.e., forward voltage drop of the red LED) that is 2.0V within ±0.3V.

Example 2

In another nonlimiting embodiment wherein the first shunt LED 18 comprises a single white LED connected in parallel with another white LED and the second shunt LED 20 comprises a red LED, for a current of 350 mA passing through the second shunt LED 20, the first regulated voltage $V_{REG}$1 generated by the first shunt node N1 equals the equivalent forward voltage drop across the first shunt LED 18 (i.e., forward voltage drop of the white LED) that is 2.8V within ±0.3V. In this manner, the second shunt node N2 can provide a second regulated voltage $V_{REG}$2 of 4.8V within ±0.6V equal to the forward voltage drop across the first shunt LED 18 and the second shunt LED 20 (i.e., forward voltage drop of a red LED added to the forward voltage drop of a white LED).

Example 3

In yet another nonlimiting embodiment wherein the third shunt LED 24 comprises of a white LED and a red LED connected in series, for a current of 350 mA passing through the third shunt LED 24, the third shunt node N3 can provide a third regulated voltage $V_{REG}$3 of 4.8V within ±0.6V equal to the equivalent forward voltage drop across the third shunt LED 24 (i.e., forward voltage drop of a red LED added to the forward voltage drop of a white LED).

Figure 2:
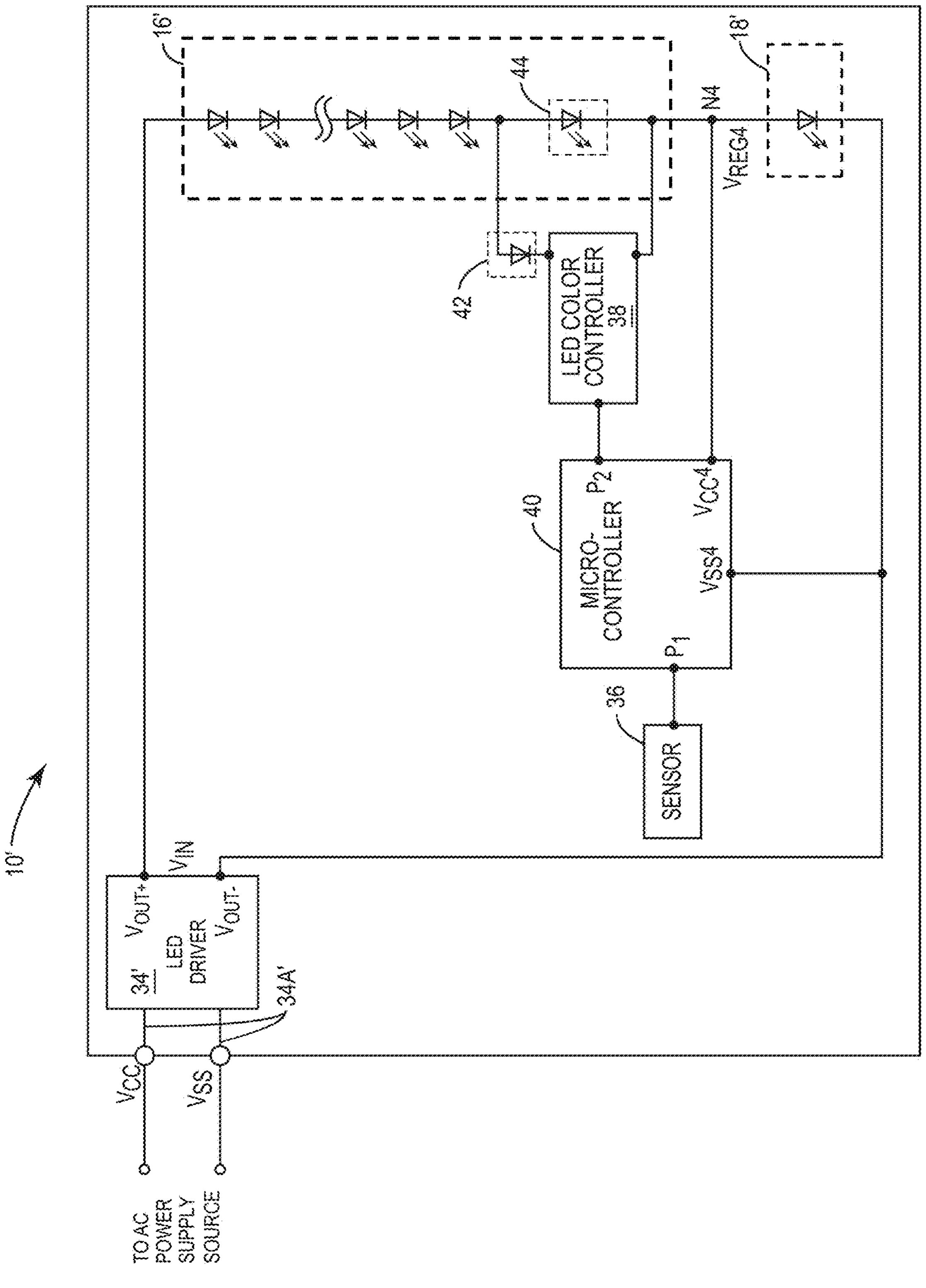
FIG. 2 illustrates an exemplary block diagram of the LED fixture device according to an embodiment of the present disclosure.

FIG. 2 illustrates an exemplary block diagram of a LED fixture device 10' according to an embodiment of the present disclosure. The LED fixture device 10' comprises a positive supply terminal $V_{CC}$ and a negative supply terminal $V_{SS}$ and includes a first LED array 16' connected to a first shunt LED 18' to form a fourth shunt node N4. The LED fixture device 10' further comprises a sensor 36 and an LED color controller 38 connected to a microcontroller 40 powered by a fourth regulated voltage $V_{REG}$4 generated at the fourth shunt node N4.

In application, the positive supply terminal $V_{CC}$ and the negative supply terminal $V_{SS}$ are connected to an external power supply source (not shown), for example, an alternating current (AC) power source or a DC power supply source. An LED driver 34' having a positive output terminal $V_{OUT+}$ and a negative output terminal $V_{OUT-}$ connects to the positive supply terminal $V_{CC}$ and the negative supply terminal $V_{SS}$ using a pair of power input lines 34A'. During operation, the LED driver 34' generates a potential difference between the positive output terminal $V_{OUT+}$ and the negative output terminal $V_{OUT-}$ that equals a DC input voltage $V_{IN}$. In this manner, the LED driver 34' provides the rest of the LED fixture device 10' with a desired, constant, and stable input current $I_{IN}$. The DC input voltage $V_{IN}$ may have a minimum of 12V, 36V, 55V, or 150V and a maximum of 15V, 45V, 60V, or 200V. The input current $I_{IN}$ may have a nominal value of 150 mA, 350 mA, 700 mA, or 2000 mA.

The microcontroller 40 includes an internal voltage regulator (not shown) and comprises a fourth positive supply terminal $V_{CC}$4 and a fourth negative supply terminal $V_{SS}$4 that are supplied with a voltage potential difference having an input voltage requirement with a minimum of 2.0V, 3.0V, or 3.3V to 5.0V, 5.5V, or 9.0V for a safe and reliable operation of the device. In this regard, the voltage required to operate the microcontroller 40 is substantially lower than the input voltage $V_{IN}$ of the LED fixture device 10'. Therefore, the input voltage $V_{IN}$ should be regulated to a lower voltage to meet the voltage requirements of the microcontroller 40.

As with the configuration of the LED fixture device 10', the fourth negative supply terminal $V_{SS}$4 connects to the negative output terminal $V_{OUT-}$ and the fourth positive supply terminal $V_{CC}$4 connects to the fourth shunt node N4 configured to supply the microcontroller 40 with the fourth regulated voltage $V_{REG}$4. Therefore, since the first shunt LED 18' only comprises a single LED, the LED of the first shunt LED 18' should be selected such that the forward voltage of the first shunt LED 18', and, therefore, the fourth regulated voltage $V_{REG}$4 generated at the fourth shunt node N4 meets the voltage requirements of the microcontroller 40.

In a nonlimiting embodiment, the first shunt LED 18' may comprise a white LED. In this manner, for a given current 350 mA supplied by the LED driver 34', the fourth regulated voltage $V_{REG}$4 equals the equivalent forward voltage drop across the first shunt LED 18' (i.e., forward voltage drop of the white LED) that is 2.8V within ±0.3V.

In various embodiments, the LED fixture device 10' may comprise a sensor such as the sensor 36, which may be one of, for example, a photodiode light sensor, an infrared sensor, or a temperature sensor, connects to a first input/output pin P1 of the microcontroller 40. In this manner, input data signals are fed to the microcontroller 40.

The LED color controller 38 connects to a second input/output pin P2 of the microcontroller 40 that is configured to turn the LED color controller 38 ON and OFF according to a set of instructions or an outside stimulus. In this manner, a first one or more LED 42 may be used to adjust and fine-tune the color or color mixture of a second one or more LED 44 as part of the first LED array 16'.

Figure 3:
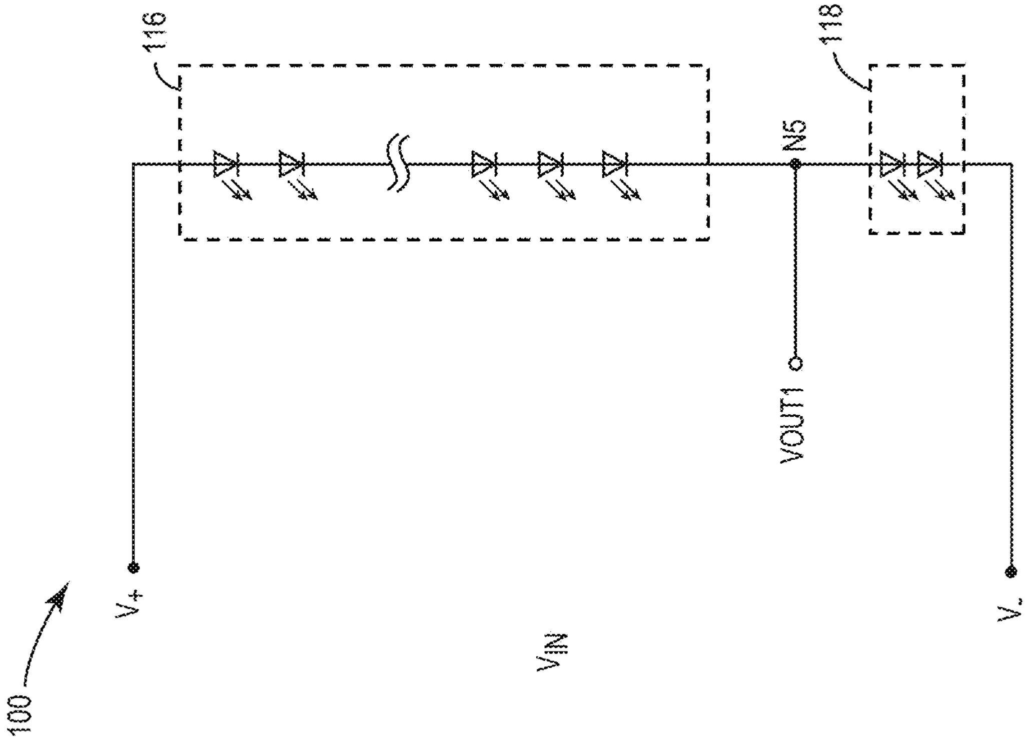
FIG. 3 illustrates a simplified diagram of the LED fixture circuit wherein a first shunt LED is utilized as a light-emitting shunt component.

FIG. 3 illustrates a simplified diagram of an LED fixture circuit 100 wherein a first shunt LED 118 is utilized as a light-emitting shunt component. The LED fixture circuit 100 comprises a positive voltage node $V_+$ and a negative voltage node $V_-$ and includes a first LED array 116 connected to the first shunt LED 118 to form a fifth shunt node N5. The positive voltage node $V_+$ and the negative voltage node $V_-$ are configured to have a potential difference equal to a DC input voltage $V_{IN}$ and supply the first LED array 116 and the first shunt LED 118 with a constant and stable input current $I_{IN}$.

The first shunt LED 118 comprises two LEDs connected in series. In this manner, for the input current $I_{IN}$ of 350 mA, the fifth shunt node N5 and therefore a first output terminal VOUT1 would have a regulated voltage that may be in the range of 4.0V, 4.8V, or 5.6V. For example, in a nonlimiting embodiment, the first shunt LED 118 may comprise a red LED and a green LED. Therefore, for an input current $I_{IN}$ of 350 mA within ±50 mA the first output terminal VOUT1 of 4.8V ±0.6V can be supplied to internal components of the LED fixture device (not shown).

Figure 4:
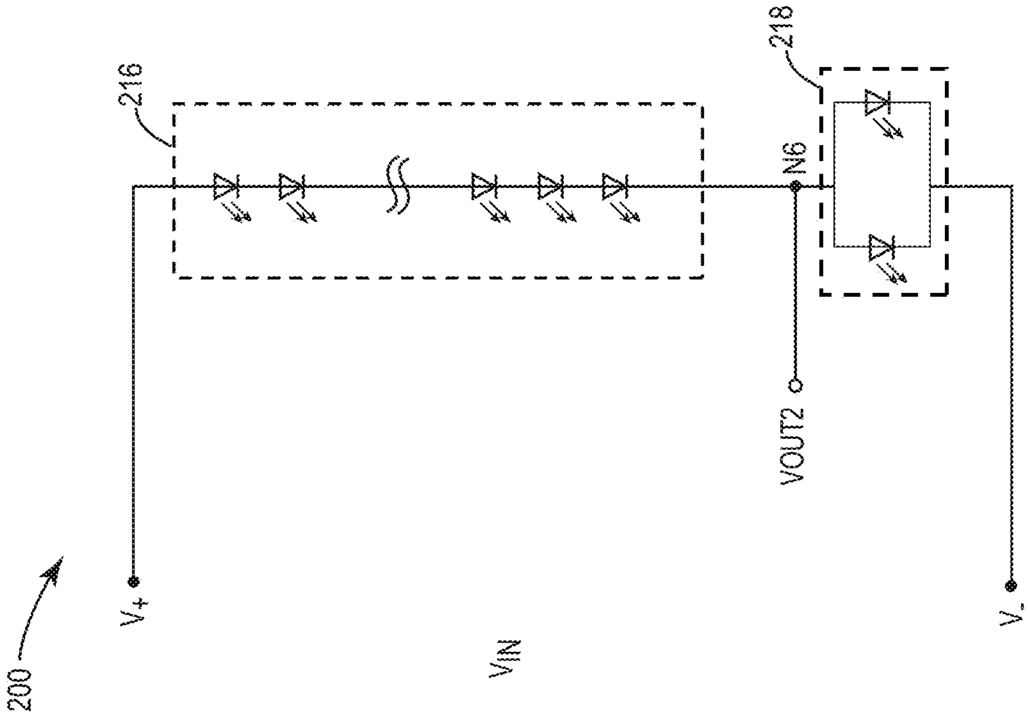
FIG. 4 shows an exemplary diagram of an LED fixture circuit having a first shunt LED that includes two LEDs connected in parallel.

FIG. 4 shows an exemplary diagram of an LED fixture circuit 200 having a first shunt LED 218 that includes two LEDs connected in parallel. The LED fixture circuit 200 has a substantially similar circuit topology to the LED fixture circuit 100 as shown in FIG. 3 with the exception that the first shunt LED 218 as shown in the LED fixture circuit 200 comprises two LEDs connected in parallel forming a sixth shunt node N6 generating a second output voltage VOUT2. Other aspects of the LED fixture circuit 200 are similar to that of the LED fixture circuit 100 and are therefore not described in depth here for the sake of brevity of the description.

In operation, for the input current $I_{IN}$ of 350 mA, the sixth shunt node N6 and therefore a second output terminal VOUT2 would have a regulated voltage that may be in the range of 1.8V, 2.0V, 2.8V, or 3.0V. For example, in a nonlimiting embodiment, the first shunt LED 218 may comprise two white LEDs. Therefore, for an input current $I_{IN}$ of 350 mA within ±50 mA, the second output terminal VOUT2 of 2.8V ±0.3V can be supplied to internal components of the LED fixture device (not shown).

Figure 5:
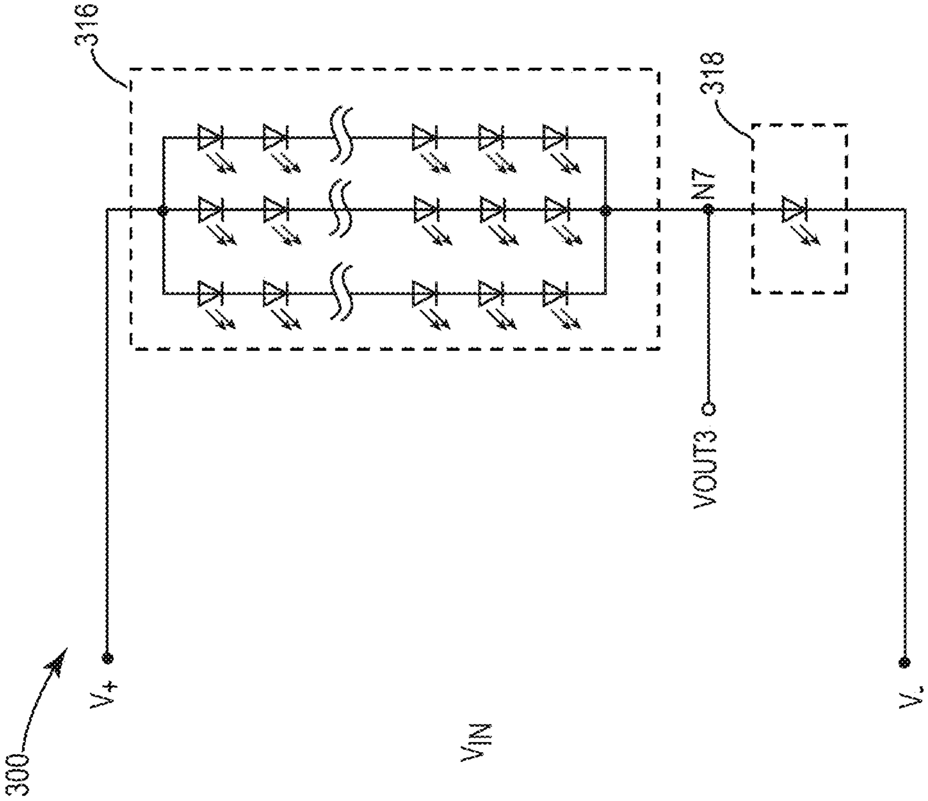
FIG. 5 shows an exemplary diagram of an LED fixture circuit having a first LED array that includes three strings of series-connected LEDs connected in parallel.

FIG. 5 shows an exemplary diagram of an LED fixture circuit 300 having a first LED array 316 that includes three strings of series-connected LEDs connected in parallel. The LED fixture circuit 300 has a substantially similar circuit topology to the LED fixture circuit 100 as shown in FIG. 3 with the exception that the first LED array 316 as shown in the LED fixture circuit 200 comprises three strings of series-connected LEDs connected in parallel, forming a seventh shunt node N7 generating a third output voltage VOUT3. Other aspects of the LED fixture circuit 200 are similar to that of the LED fixture circuit 100 and are therefore not described in depth here for the sake of brevity of the description.

Each of the three strings of LEDs of the first LED array 316 comprises a plurality of LEDs of the same or a different type. It should be appreciated that for the input current $I_{IN}$ to be equally divided between each string, forward voltage drop of LEDs in each of the three strings of LEDs of the first LED array 316 should be substantially equal to one another.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A light-emitting diode (LED) fixture circuit, comprising:

a first LED array comprising a plurality of LEDs connected in series, parallel, or a combination thereof between a first input node and a first output node;

a first shunt LED comprising one or more LEDs connected in series, parallel, or a combination thereof between a second input node and a second output node; and a first shunt terminal that outputs a first regulated voltage generated at the second input node;

wherein the first input node and the second output node are configured to have a potential difference equal to a direct current (DC) input voltage, and the first output node couples to the second input node; and wherein the first regulated voltage equals a forward voltage drop across the first shunt LED and the first regulated voltage is lower than the DC input voltage.

2. The LED fixture circuit according to claim 1 wherein the first input node is supplied with a constant DC input current in the range of 0 mA to 2000 mA.

3. The LED fixture circuit according to claim 2 wherein the DC input voltage is in the range of 12V to 200V.

4. The LED fixture circuit according to claim 2 wherein the first shunt LED comprises one or more series-connected LEDs between the second input node and the second output node with the forward voltage drop in the range of 2V to 12V.

5. The LED fixture circuit according to claim 2 wherein the first shunt LED further comprises two or more substantially similar LEDs connected in parallel between the second input node and the second output node with the forward voltage drop in the range of 2V to 12V.

6. The LED fixture circuit according to claim 1 wherein each LED forming part of the first LED array and the first shunt LED is configured to generate a white, a red, a green, a blue, a yellow, or an amber light, or light that is a mixture thereof.

7. The LED fixture circuit according to claim 1 further comprising:

a second shunt LED comprising one or more LEDs connected in series, parallel, or a combination thereof between a third input node and a third output node; and a second shunt terminal that outputs a second regulated voltage generated at the third input node;

wherein the first output node couples to the second input node via the second shunt LED such that the third input node connects to the first output node and the third output node connects to the second input node; and wherein the second regulated voltage equals a forward voltage drop across the second shunt LED and the first shunt LED and the second regulated voltage is higher than the first regulated voltage and lower than the DC input voltage.

8. The LED fixture circuit according to claim 7 further comprising:

a second LED array comprising a plurality of LEDs connected in series, parallel, or a combination thereof between a fourth input node and a fourth output node;

a third shunt LED comprising one or more LEDs connected in series, parallel, or a combination thereof between a fifth input node and a fifth output node; and a third shunt terminal that outputs a third regulated voltage generated at the fifth input node;

wherein the fourth input node connects to the first input node and the fifth output node connects to the second output node and are configured to have a potential difference equal to the (DC) input voltage; and wherein the fourth output node couples to the fifth input node, and the third DC regulated voltage equals a forward voltage drop across the third shunt LED and the third regulated voltage is lower than the first DC input voltage.

9. The LED fixture circuit according to claim 8 wherein the third regulated voltage is in the range of 2V to 12V.

10. The LED fixture circuit according to claim 8 wherein each LED forming part of the first LED array, the second LED array, the first shunt LED, the second shunt LED, and the third shunt LED is configured to generate a white, a red, a green, a blue, a yellow, or an amber light, or light that is a mixture thereof.

11. An LED fixture device, comprising:

a positive supply terminal and a negative supply terminal configured to have a potential difference equal to a direct current (DC) input voltage;

a first low-voltage electronic device having a first positive supply pin and a first negative supply pin;

a first LED array comprising a plurality of LEDs connected in series, parallel, or a combination thereof between a first input node and a first output node;

a first shunt LED comprising one or more LEDs connected in series, parallel, or a combination thereof between a second input node and a second output node; and a first shunt terminal that supplies a first regulated voltage generated at the second input node and is coupled to the positive supply pin to operate the first low-voltage electronic device;

wherein the first input node connects to the positive supply terminal, the second output node and the first negative supply pin connect to the negative supply terminal, the first output node couples to the second input node; and wherein the first regulated voltage equals a forward voltage drop across the first shunt LED and the first regulated voltage is lower than the DC input voltage.

12. The LED fixture device according to claim 11 wherein the first low-voltage electronic device requires a voltage in the range of 2V to 12V for operation.

13. The LED fixture device according to claim 11 wherein the first low-voltage electronic device requires a nominal voltage equal to one or more of 2.0V, 3.0V, 3.3V, 5.0V, 9.0V, or 12.0V for operation.

14. The LED fixture device according to claim 11 further comprising a low-voltage regulator having an input pin and an output pin, wherein the first shunt terminal and the positive supply pin couple via the low-voltage regulator such that the first regulated voltage is connected to the input pin of the low-voltage regulator and the positive supply pin of the first low-voltage electronic device connects to the output pin of the low-voltage regulator configured to further regulate the first regulated voltage.

15. The LED fixture device according to claim 14 wherein the first low-voltage electronic device requires a nominal voltage equal to one or more of 2.0V, 3.0V, 3.3V, 5.0V, 9.0V, or 12.0V for operation.

16. The LED fixture device according to claim 11 wherein a power supply terminal connects to an external LED driver configured to receive an alternating current (AC) input voltage from a power supply source and supply a constant DC input current in the range of 0 mA to 2000 mA through the positive supply terminal.

17. The LED fixture device according to claim 16 wherein the DC input voltage is in the range of 12V to 200V.

18. The LED fixture device according to claim 11 wherein the first low-voltage electronic device is one of a processing unit, a control unit, a sensor, a data storage unit, a wireless transmitter/receiver, or a low-voltage integrated circuit.

19. The LED fixture device according to claim 11 wherein each LED forming part of the first LED array and the first shunt LED is configured to generate a white, a red, a green, a blue, a yellow, or an amber light, or light that is a mixture thereof.

* * * * *